United States Patent Office 3,527,745
Patented Sept. 8, 1970

3,527,745
REACTIVE AZO DYESTUFFS CONTAINING A THIOPHENE DIOXIDE
Angelo Mangini, Antonio Tundo, Bianca Flavia Bonini, Marta Rossetti, and Germana Mazzanti, Bologna, Italy, assignors to Aziende Colori Nazionali Affini ACNA S.p.A., Milan, Italy
No Drawing. Filed Nov. 30, 1966, Ser. No. 597,877
Claims priority, application Italy, Dec. 3, 1965, 26,939/65
Int. Cl. C09b 62/38, 62/42, 62/40
U.S. Cl. 260—146        7 Claims

ABSTRACT OF THE DISCLOSURE

A class of fiber-reactive dyestuffs, capable of forming, during the dyeing process, bonds with the hydroxyls of cellulose, with the $NH_2$ groups of protein fibers and with the —NH— groups of synthetic polyamide fibers, thus giving colors which are particularly stable to wet treatments. The dyestuff molecule contains the benzothiophene dioxide radical,

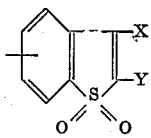

wherein X and Y are either a halogen or hydrogen, at least one of X and Y being a halogen. The preferred halogen is chlorine.

---

Various classes of fiber-reactive dyestuffs are known. These include dyestuffs comprising one of the following radicals: monochlorotriazinyl, dichlorotriazinyl, trichloropyrimidyl, vinylsulfonyl, dichloroquinoxalyl, etc. The conditions under which these dyestuffs are applied vary depending upon the reactivity of the reactive groups present.

We have now surprisingly found a new class of reactive dyestuffs, characterized by containing, as the reactive radical, the residue (I):

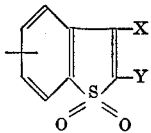

wherein X and Y are each selected from the group consisting of a halogen, preferably chlorine, and hydrogen, at least one of X and Y being a halogen, said dyestuffs having the general formula (II):

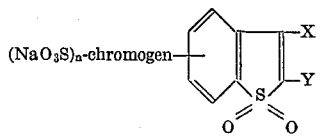

in which:
$n$ is an integer between 1 and 4;
X and Y are as defined above; and the term "chromogen" represents a dyestuff residue, e.g. of the azo, metallized azo, anthraquinone, phthalocyanine type, etc.

The reactive radical (I) containing the mobile hydrogen, when bonded to a dyestuff residue, renders the resulting dyestuff reactive, due to the presence of the halogen X or Y, with the —OH groups of cellulose, with —$NH_2$ groups of protein fibers and with the —NH— groups of synthetic polyamides, under suitable conditions of pH (for polyamide fibers neutral or slightly acid whilst for the cellulose fibers a pH of 8 to 11), temperature (50 to 90° C.) etc., to thus form covalent chemical bonds between the dyestuff and the fiber. The dyeings thus obtained have very good general fastness and, more particularly, excellent fastness to wet treatments, such as to washing to sea water, to perspiration, and fastnesses to dry cleaning and to rubbing.

The dyestuff having the general Formula II can be prepared, e.g., by condensing an intermediate compound of the Formula IV:

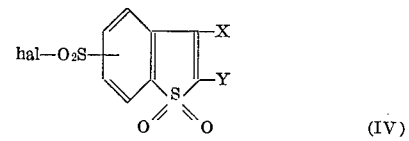

wherein X and Y are as defined above and "hal" is a halogen atom, preferably chlorine, with an organic dyestuff containing an amino radical having at least one replaceable hydrogen atom.

The dyestuffs having the general formula III:

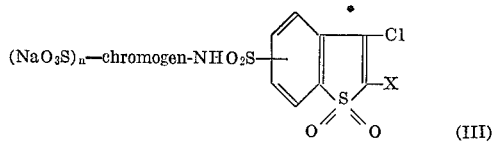

wherein X is Cl or H, have particularly valuable dyeing characteristics.

The dyestuffs of general Formula III can be prepared by directly condensing the intermediate compound (V):

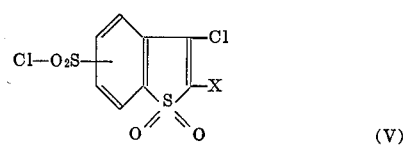

wherein X is chlorine or hydrogen, with phthalocyanines, azo dyestuffs, metallized azo dyestuffs or anthraquinone dyestuffs which contain an amino radical having at least one reactive hydrogen atom.

The order of the several condensations of the intermediate components in the preparation of the dyestuffs having the general Formulas II and III can be varied depending on the dyestuff to be prepared.

Thus, the dyestuffs having the formula VI.

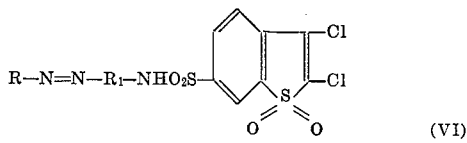

wherein R is a radical selected from the group consisting of sulfonated naphthylamines, sulfonated naphthols, sulfonated aminonaphthols or other similar coupling compounds; and $R_1$ is a substituted or unsubstituted aromatic nucleus selected from the group consisting of benzene, naphthalene and diphenyl nuclei wherein the substituents are $SO_3H$ radicals, halogen or lower alkyls, are advantageously prepared by sulfochlorinating, under suitable conditions, (see "Houben Weyl" Methoden der Org. Chem., vol. IX, p. 573, Ed. 1955), 2,3-dichloro-benzothiophene-dioxide and then condensing the compound thus obtained with the aromatic diamine, $H_2N—R_1—NH_2$, then diazotizing and, finally, coupling the product thus prepared with the selected coupling agent (R).

On the other hand, the dyestuffs having the Formula VII:

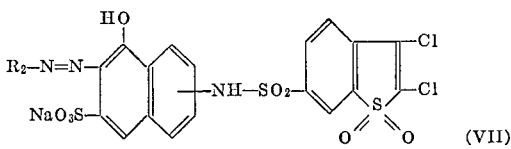

wherein $R_2$ is a substituted or unsubstituted benzene, naphthalene or diphenyl nucleus wherein the substituents are $SO_3H$ radicals, halogens or lower alkyls, are preferably prepared by sulfochlorinating 2,3 - dichloro-benzothiophene-dioxide, reacting with suitably substituted aminonaphthols to form the intermediate compound:

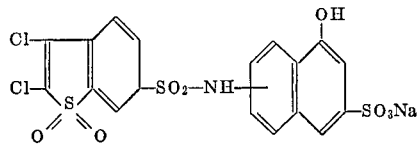

and then carrying out the coupling with the desired diazonium salt.

The reactive dyestuffs of the present invention may be used in the dyeing of cellulose fibers by operating, according to the known technique (U.S. Pats. 2,892,670 and 2,892,671, for instance), in a bath containing an acid-binding agent, such as an alkaline hydroxide or bicarbonate, and, optionally, an electrolyte (NaCl, $Na_2SO_4$, etc.), which causes a better exhaustion of the dyebath.

The dyestuffs of the present invention have a particularly high reactivity. When applied to cellulosic materials they give dyeings of full intensity from a dyebath at a temperature as low as 55–60° C., while at the same time allowing a rapid exhaustion of the dyebath. They can, therefore, be applied by continuous dyeing processes including impregnation and, more particularly, the system of foulard (cold pad-batels method) and cold winding up.

The following examples are presented to further illustrate the present invention but are not intended to limit the scope thereof.

EXAMPLE 1

(a) Preparation of 2,3-dichloro-benzothiophene-dioxide-6-sulfochloride 0.3 mols of 2,3-dichloro-benzothiophene-dioxide (prepared according to the process described in J.A.C.S., vol. 73, pp. 2614–16) and 1.5 mols of sulfuric chlorohydrin were heated at 130° C. for 30 minutes.

After spontaneous cooling at about 50° C., the reaction mass was poured into ice water and the resulting precipitate separated by filtration and dried.

By crystallization of the reaction product from a benzene-ligroin mixture, a crystalline compound having a melting point of 185–186° C. was obtained which analysis showed to have the structure (VIII):

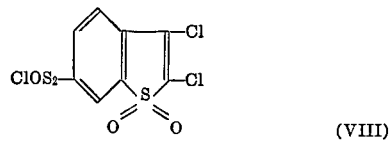

(b) Preparation of the amino compound (IX)

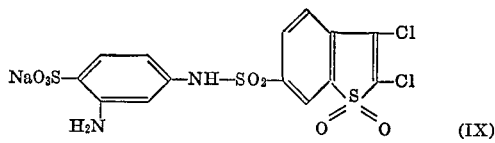

0.1 mols of compound (VIII) were dissolved in 800 ml. of acetone and the solution obtained was added dropwise, while agitating, within 25 minutes to a neutral solution of 0.1 mol of 2,4-diamino-benzenesulfonic acid in 1200 ml. of water containing 0.1 mol of sodium acetate, while keeping the temperature at 20–22° C.

At the end of the addition, the reaction mixture was agitated at 22° C. for 90 minutes and then neutralized with 10% aqueous $Na_2CO_3$. During the condensation reaction, an equivalent of chlorine was released.

(c) Preparation of the dyestuff

The solution thus obtained was used as is for the preparation of the following dyestuff:

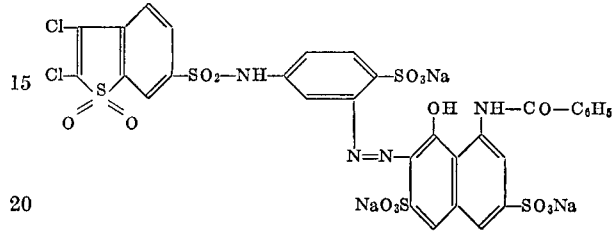

0.1 mol of the amine (IX), obtained as described in procedure (b) above, was directly diazotized and the diazonium salt coupled at 4–6° C. with 0.1 mol of benzoyl-H acid (8-benzoylamino-1-naphthol-3,6 disulfonic acid) at a pH of 8. When the addition of the diazonium salt was completed, the reaction mass was agitated for 3–4 hours, the pH then adjusted to 7.2, and the dyestuff salted out with the required amount of NaCl.

The precipitate obtained was collected by filtration and dried at 40° C. It dyed cotton a red color which had a good fastness to washing.

EXAMPLE 2

Using 1-(4'-sulfo-phenyl)-3-methyl-5-pyrazolone as the coupling agent for the amine (IX) prepared as described in Example 1, a dyestuff having the following formula was obtained:

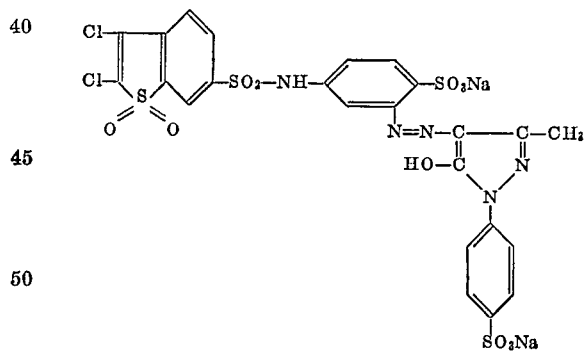

It dyed cotton a yellow color which was vert resistant to wet treatments.

EXAMPLE 3

By coupling amine (IX), prepared as described in Example 1, with benzoyl-K acid (8-benzoylamino-1-naphthol-3,5-disulfonic acid), the following dyestuff was obtained:

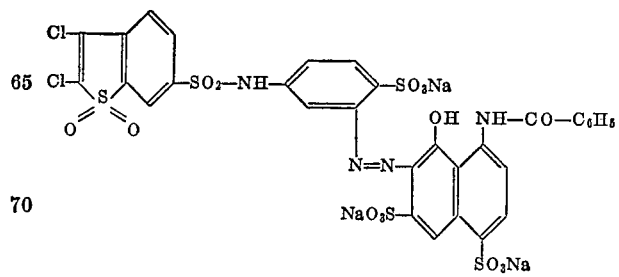

It dyed cotton a red color, having outstanding fastness properties.

EXAMPLE 4

By using 1-(2',5'-dichloro-4'-sulfo-phenyl)-3-methyl-5-pyrazolone as coupling agent for amine (IX), prepared as described in Example 1, the following dyestuff was obtained:

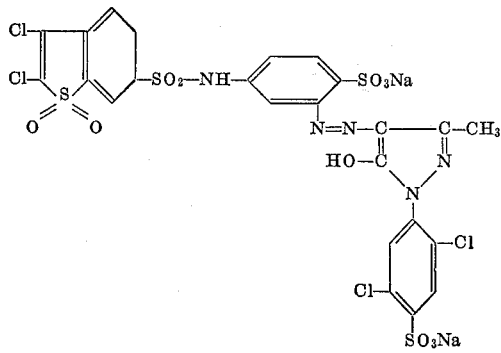

It dyed cellulose fibers a yellow color which had a good fastness to washing.

EXAMPLE 5

By starting with amine (IX) prepared as described in Example 1, but using as the coupling agent the ureide of isogamma acid, the following dyestuff was obtained:

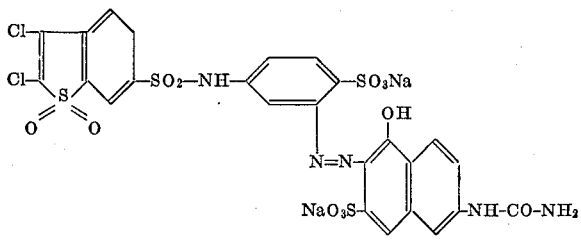

It dyed coton an orange color having a good fastness.

EXAMPLE 6

A dyestuff having the following structure:

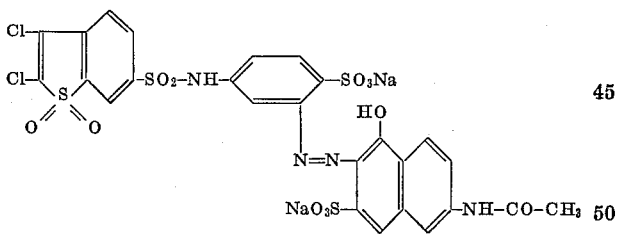

was obtained by using acetyl-isogamma acid instead of ureoisogamma acid as the coupling agent for amine (IX), prepared as described in Example 1.

This dyestuff dyed coton an orange color having outstanding properties toward wet treatments.

EXAMPLE 7

0.1 mol of the sulfochloride (VIII), prepared as described in Example 1, dissolved in 800 ml. of acetone, was added dropwise while agitating, over 30 minutes, to a neutral solution of 0.1 mol of isogamma acid in 1800 ml. of water containing 0.1 mol of sodium acetate, while keeping the temperature at between 20° C. and 25° C.

At the end of the addition, the reaction mixture was agitated at about 25° C. for 1 hour and 30 minutes and the solution obtained was neutralized with 10% aqueous $Na_2CO_3$.

The naphthol-derivative:

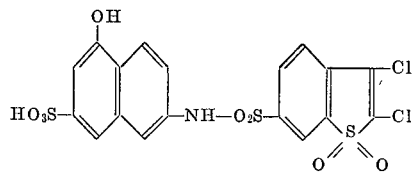

contained in this solution was coupled in a slightly alkaline medium with the diazonium salt of orthanilic acid.

The following dyestuff was obtained:

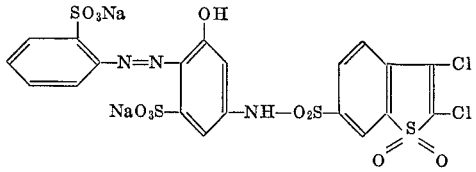

It dyed cellulose fibers with an orange color having outstanding fastness properties.

EXAMPLE 8

By operating as described in Example 7, but using as the diazo component the diazonium salt of Tobias acid, the following dyestuff was obtained:

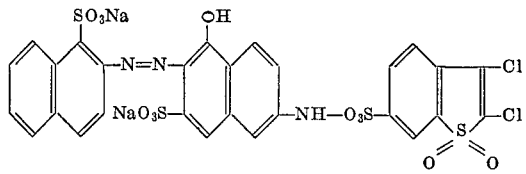

It dyed coton an orange shade having outstanding fastness properties.

EXAMPLE 9

By operating as described in Example 7, but using as the diazo component the diazonium salt of m-amino-benzoic acid, the following dyestuff was obtained:

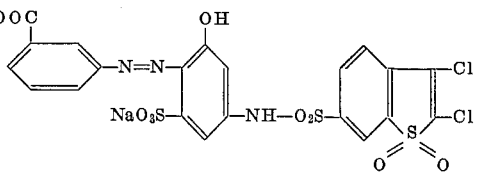

It dyed cellulose fibers a brilliant orange color having outstanding fastness properties.

EXAMPLE 10

The dyestuff having the following structure:

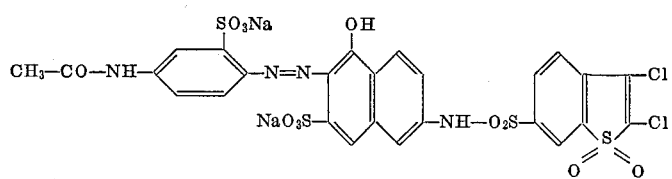

was obtained by coupling, in a slightly alkaline medium (pH=8), the diazonium salt of 1-amino-2-sulfo-4-acetyl-aniline with the condensation product of the sulfochloride (VIII) with isogamma acid. It dyed cotton a scarlet color having good fastness properties.

EXAMPLE 11

By operating as described in Example 7, but using as the diazo component the diazonium salt of amino-G acid, (2-amino-6,8-naphthalenedisulfonic acid), the following dyestuff was obtained:

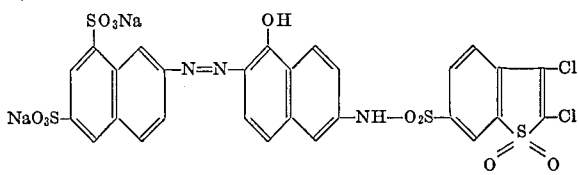

It dyed coton a scarlet color having good fastness properties.

EXAMPLE 12

0.1 mol of the sulfochloride (VIII), prepared as described in Example 1, was dissolved in 1200 ml. of acetone and the acetone solution added dropwise, while agitating at 20° C., to an aqueous solution containing 0.1 mol of the amine:

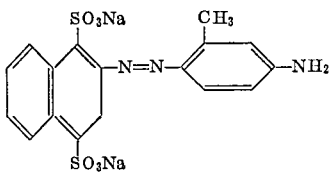

and 0.1 mol of sodium acetate.

At the end of the addition, agitation was continued for 2–3 hours until complete solution. The reaction mixture was then neutralized with 10% aqueous $Na_2CO_3$ and salted out. After filtration, the dyestuff having the following structural formula was obtained in the form of a yellow powder which dyed cotton a yellow color having good fastness properties.

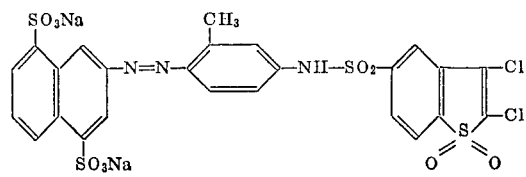

EXAMPLE 13

By operating as described in Example 12, 0.1 mol of the amino derivative having the structure:

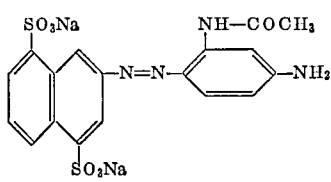

was condensed with 0.1 mol of the sulfochloride (VIII), prepared as described in Example 1.

A dyestuff was obtained in the form of a yellow powder having the structure:

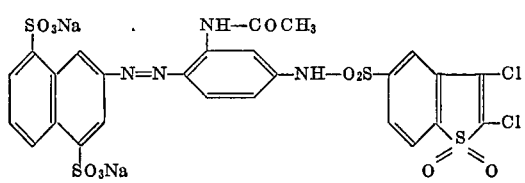

It dyed cotton a yellow color having good fastness properties.

EXAMPLE 14

0.1 mol of the sulfochloride (VIII) prepared as described in Example 1, was dissolved in 1200 ml. of acetone and the solution was added dropwise, while agitating at 20° C., to an aqueous solution containing 0.1 mol of 1-amino-2-sulfo-4-(4'-amino-3' - sulfoanilino) - anthraquinone and 0.1 mol of sodium acetate.

At the end of the addition, agitation was continued until complete solution and the mixture was then neutralized with a 10% $Na_2CO_3$ solution and the dyestuff salted out with NaCl till precipitation.

The dyestuff was isolated by filtration and has the following structural formula:

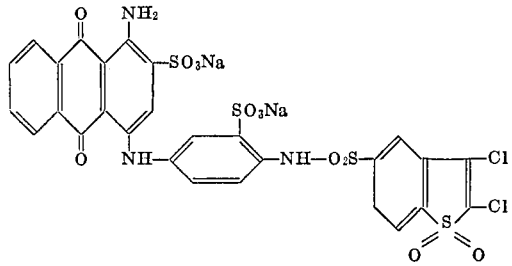

It dyed cellulose fibers a blue shade having outstanding fastness properties.

EXAMPLE 15

0.1 mol of the compound:

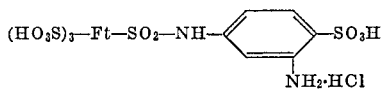

wherein Ft is copper-phthalocyanine, was suspended in water and the suspension neutralized with 10% aqueous $Na_2CO_3$ to effect a solution. 0.1 mol of sodium acetate was added and an acetone solution of 0.1 mol of the sulfochloride (VIII) was added dropwise at 20° C. as in Example 14. The reaction mixture was agitated at 20° C. for 2–3 hours until complete solution and was then neutralized and the dyestuff salted out.

The dyestuff, collected by filtration, had the following structural formula:

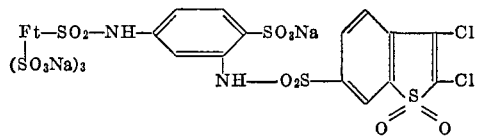

It dyed cotton a turquoise color having outstanding fastness properties.

EXAMPLE 16

The dyestuff having the following structural formula:

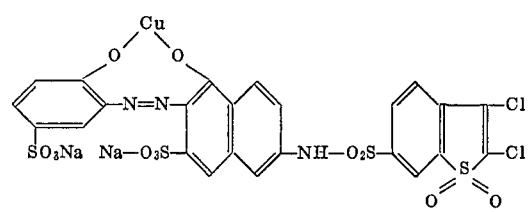

was prepared by condensing in water 0.1 mol of the following copper complex:

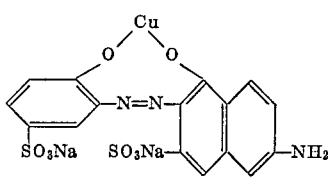

with 0.1 mol of the sulfochloride (VIII) in the presence of 0.1 mol of sodium acetate by following the procedure described in Example 12.

It dyed cotton a brilliant ruby color, having outstanding fastness properties to wet treatments.

EXAMPLE 17

The dyestuff having the following structural formula:

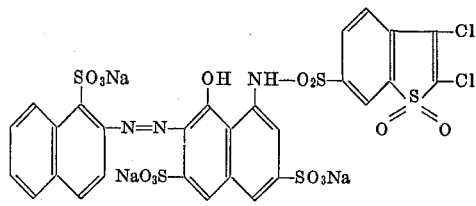

was obtained by condensing 0.1 mol of the following monoazo dye:

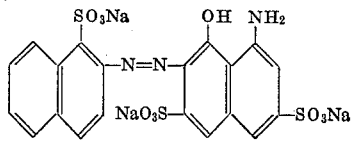

with 0.1 mol of the sulfochloride (VIII) in the presence of 0.1 mol of sodium acetate, by following the procedure described in Example 12.

It dyed cotton a brilliant red color having outstanding fastness properties to washings.

EXAMPLE 18

2 parts of the dyestuff prepared as described in Example 7 were dissolved in 2000 parts of cold water. The dye bath thus obtaiend was heated for 15 to 20 minutes to 55–60° C. and 100 parts of a well wet cotton yarn were introduced. Sodium sulfate was then added in two doses to reach a concentration of 40 g./l., the first addition being carried out after 5 minutes and the second addition 15 minutes afterwards. After 20 minutes, the temperature of the dye batn was lowered to 50° C. and 5–8 g./l. of anhydrous sodium carbonate were added. The dyeing was then continued for an additional 60 minutes.

After this time, the dye bath was discharged and the yarn carefully washed first with cold water, then with boilng water and finally with a solution of a non-ionic detergent (1–3 g./l.) for 30 minutes.

The resolting cotton yarn was dyed a brilliant orange color having ootstanding fastness properties.

Variations can, of course, be maed without departing from the spirit or scope of the invention.

Having thus described our invention, what we desire to secure by Letters Patent and hereby claim is:

1. A reactive dyestuff having the formula:

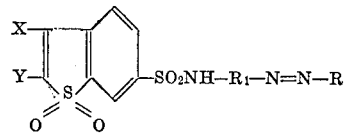

wherein X and Y are each selected from the group consisting of chlorine and hydrogen, at least one of X and Y being chlorine; and wherein R is a substituted nucleus selected from the group consisting of a sulfonated naphthylamine, a sulfonated napthol, a sulfonated aminonaphtol, a sulfonated phenyl and a pyrazolone substituted by —$SO_3H$ wherein the substituents are selected from the group consisting of H, —$SO_3H$, —OH, —$NH_2$, —Cl, benzoylamino lower alkyl,

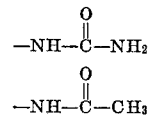

COOH and phenyl —$SO_3H$ and wherein $R_1$ is a substituted aromatic nucleus selected from the group consisting of phenyl, naphthyl and diphenyl and the substituents on which are selected from the group consisting of —H, —$SO_3H$, —Cl, lower alkyl, OH and

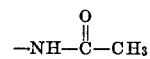

2. The azo dyestuff of claim 1 wherein said dyestuff is metallized with copper.

3. The dyestuff of claim 1 having the formula:

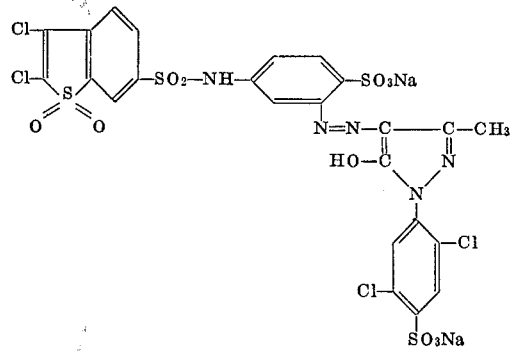

4. The dyestuff of claim 1 having the formula:

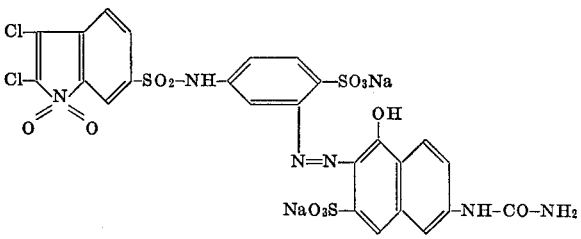

5. The dyestuff of claim 1 having the formula:

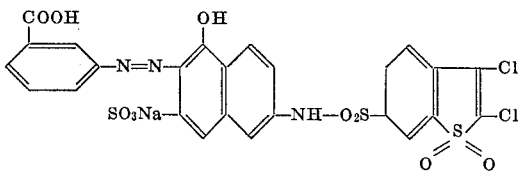

6. The dyestuff of claim 1 having the formula:

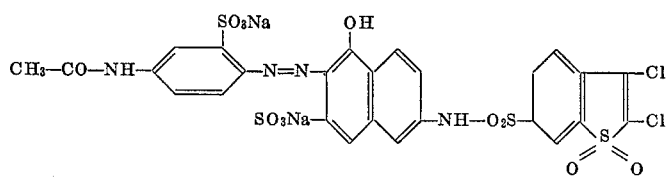

7. The dyestuff of claim 1 having the formula

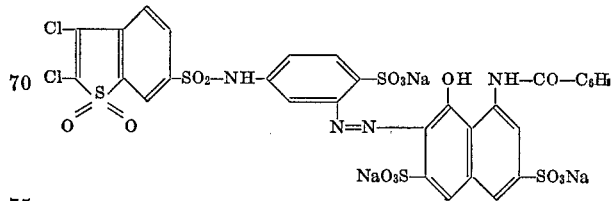

(References on following page)

References Cited

UNITED STATES PATENTS

| | | | |
|---|---|---|---|
| 2,776,957 | 1/1957 | Brentano et al. | 260—52 XR |
| 2,752,333 | 6/1956 | Lecher et al. | 260—152 XR |
| 3,177,198 | 4/1965 | Weis et al. | 260—152 |
| 3,234,208 | 2/1966 | Liechti | 260—152 XR |
| 3,249,603 | 5/1966 | Bretschneider et al. | 260—154 XR |
| 3,328,395 | 6/1967 | Nitta et al. | 260—154 XR |
| 3,338,880 | 8/1967 | Favre et al. | 260—154 XR |

FLOYD D. HIGEL, Primary Examiner

U.S. CL. X.R.

260—152, 332.1, 314.5, 329.2, 329, 196

UNITED STATES PATENT OFFICE
CERTIFICATE OF CORRECTION

Patent No. 3,527,745          Dated September 8, 1970

Inventor(s) Angelo Mangini, Antonio Tundo, Bianca Flavia Bonini, Marta Rossetti, and Germana Mazzanti It is certified that error appears in the above-identified patent and that said Letters Patent are hereby corrected as shown below:

Column 2, lines 9, 11, and 48, in each instance "Formula" should read -- formula --; line 50, "VI." should read --VI:--. Column 3, line 1, "Formula" should read -- formula --; lines 16-21, the second structural formula

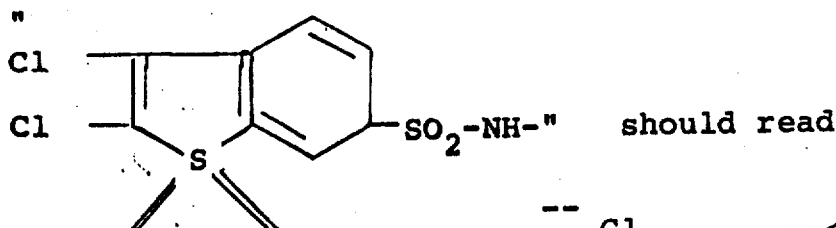   should read

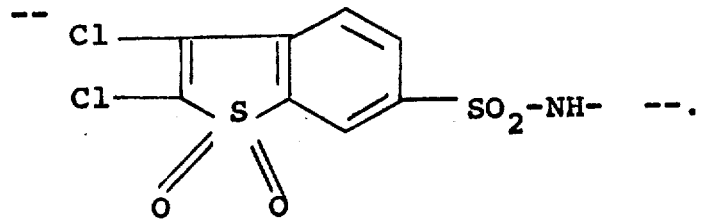

Column 4, line 54, "vert" should read -- very --.

PO-1050
(5/69)

UNITED STATES PATENT OFFICE
CERTIFICATE OF CORRECTION

Patent No. 3,527,745       Dated September 8, 1970

Inventor(s) Angelo Mangini, Antonio Tundo, Bianca Flavia Bonini, Marta Rossetti, and Germana Mazzanti It is certified that error appears in the above-identified patent and that said Letters Patent are hereby corrected as shown below:

Column 5, lines 5-10, the structural formula in Example 4,

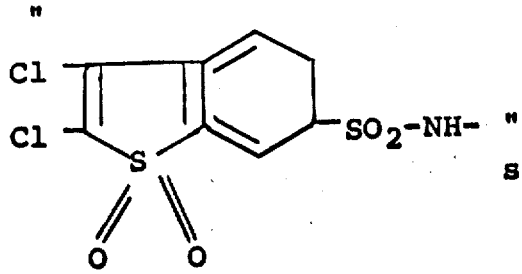 should read -- 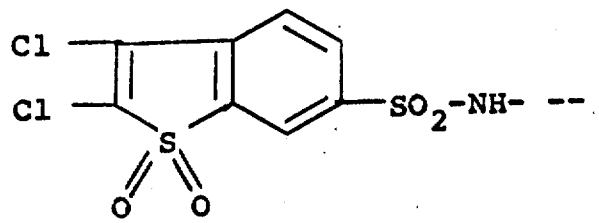

Column 5, lines 27-32, the structural formula in Example 5

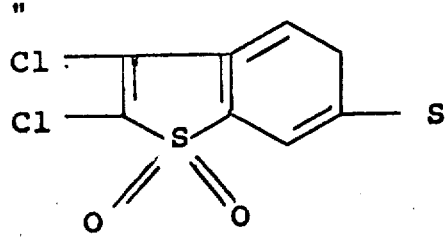 should read -- 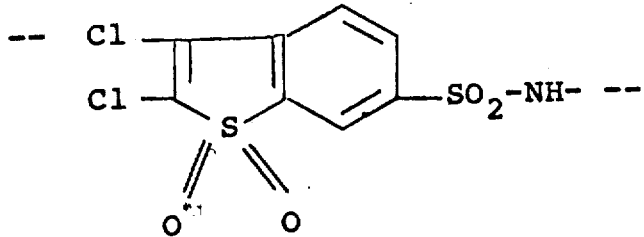

PR

PO-1050
(5/69)

UNITED STATES PATENT OFFICE
CERTIFICATE OF CORRECTION

Patent No. 3,527,745  Dated September 8, 1970

Inventor(s) Angelo Mangini, Antonio Tundo, Bianca Flavia Bonini, Marta Rossetti, and Germana Mazzanti It is certified that error appears in the above-identified patent and that said Letters Patent are hereby corrected as shown below:

Column 5, lines 38 and 55, in both instances "coton" should read --cotton--. Column 6, lines 16-22, the second structural formula in Example 7

" 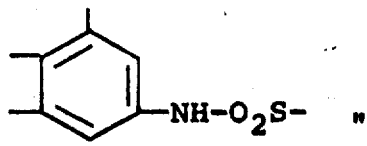 should read 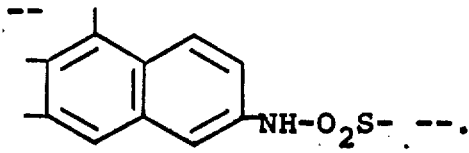 --.

Column 6, line 37, "coton" should read -- cotton --; lines 44-52, the first structural formula in Example 9, " 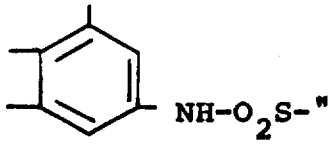  should read -- 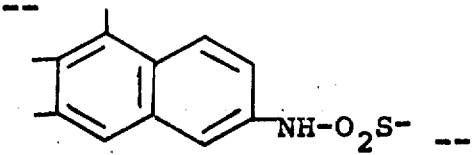 --.

UNITED STATES PATENT OFFICE
CERTIFICATE OF CORRECTION

Patent No. 3,527,745        Dated  September 8, 1970

Inventor(s) Angelo Mangini, Antonio Tundo, Bianca Flavia Bonini, Marta Rossetti, and Germana Mazzanti It is certified that error appears in the above-identified patent and that said Letters Patent are hereby corrected as shown below:

Column 7, line 10, "coton" should read -- cotton --; lines 19-25, first structural formula in Example 12

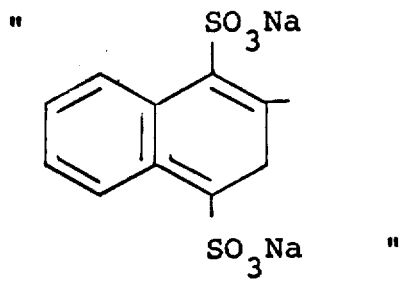   should read --   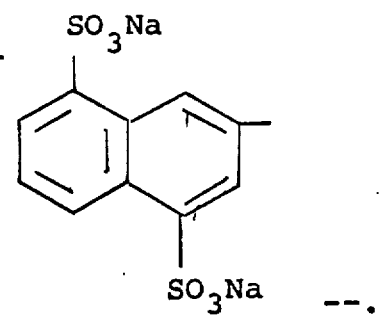 --.

Column 8, lines 7-17, the structural formula in Example 14

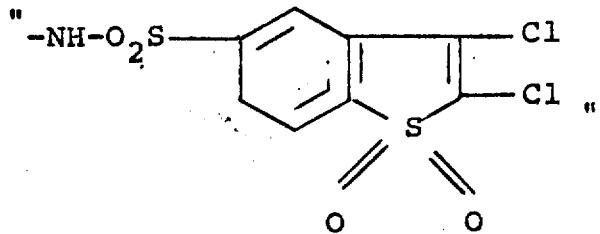   should read   -- 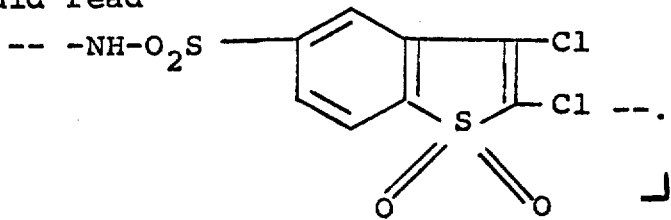 --.

PO-1050
(5/69)

UNITED STATES PATENT OFFICE
CERTIFICATE OF CORRECTION

Patent No. 3,527,745          Dated  September 8, 1970

Inventor(s) Angelo Mangini, Antonio Tundo, Bianca Flavia Bonini, ~~Marta Rossetti, and Germana Mazzanti~~

It is certified that error appears in the above-identified patent and that said Letters Patent are hereby corrected as shown below:

Column 8, lines 51-59, first structural formula in Example 16

"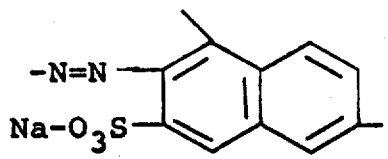 "  should read -- 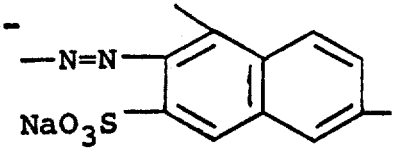 --.

Column 9, line 35, "batn" should read -- bath --; line 44, "maed" should read -- made --; line 73 (claim 1), "napthol" should read -- naphthol --. Column 10, lines 35-40, the structural formula in claim 4, "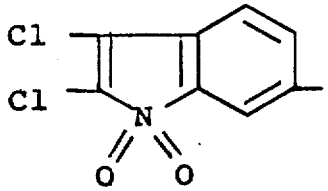"  should read -- 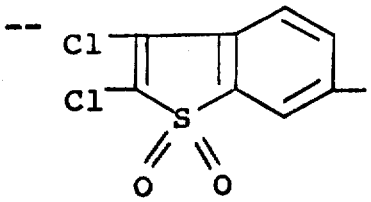 --.

PR

UNITED STATES PATENT OFFICE
CERTIFICATE OF CORRECTION

Patent No. 3,527,745                Dated September 8, 1970

Inventor(s) Angelo Mangini, Antonio Tundo, Bianca Flavia Bonini, Marta Rossetti, and Germana Mazzanti It is certified that error appears in the above-identified patent and that said Letters Patent are hereby corrected as shown below:

Column 10, the structural formula in claim 5,

" 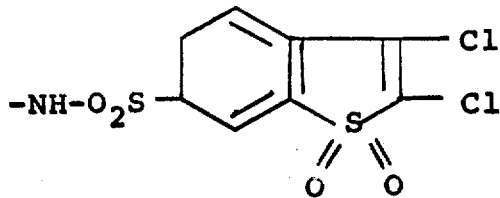  "  should read -- 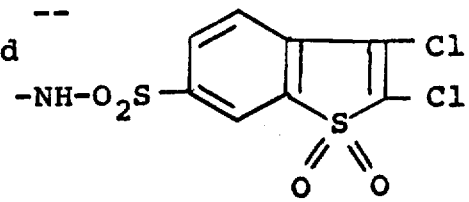 --.

Column 10, the structural formula in claim 6,

" 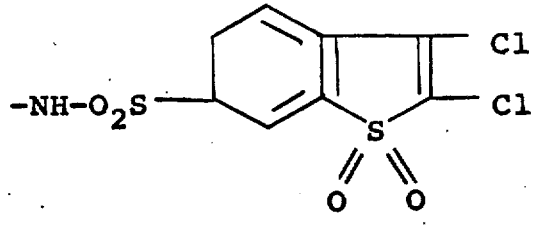  "  should read -- 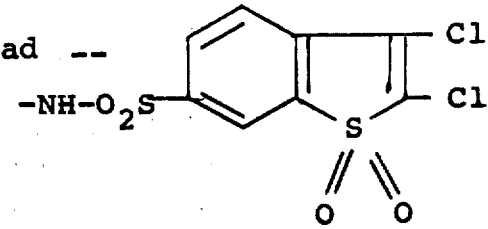 --.

PO-1050
(5/69)

UNITED STATES PATENT OFFICE
CERTIFICATE OF CORRECTION

Patent No. 3,527,745  Dated September 8, 1970

Inventor(s) Angelo Mangini, Antonio Tundo, Bianca Flavia Bonini, Marta Rossetti, and Germana Mazzanti It is certified that error appears in the above-identified patent and that said Letters Patent are hereby corrected as shown below:

Column 10, the structural formula in claim 7,

"
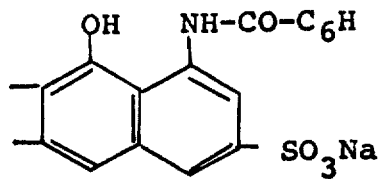

"

should read

--
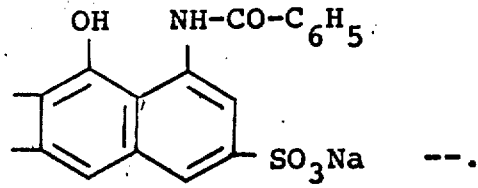
--.

Signed and sealed this 18th day of April 1972.

(SEAL)
Attest:

EDWARD M. FLETCHER, JR.
Attesting Officer

ROBERT GOTTSCHALK
Commissioner of Patents